US007602603B2

United States Patent
Cheng et al.

(10) Patent No.: US 7,602,603 B2
(45) Date of Patent: Oct. 13, 2009

(54) STACKABLE MODULAR COMPUTER HOUSING, AND COMPUTER DEVICE INCLUDING THE SAME

(75) Inventors: Sheng-Hsiung Cheng, Taipei Hsien (TW); Te-An Lin, Taipei Hsien (TW); Chij-Hsiung Chen, Taipei Hsien (TW); Wu-Nan Wang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 71 days.

(21) Appl. No.: 11/810,176

(22) Filed: Jun. 4, 2007

(65) Prior Publication Data

US 2007/0281531 A1 Dec. 6, 2007

(30) Foreign Application Priority Data

Jun. 6, 2006 (TW) .............................. 95120014 A

(51) Int. Cl.
*G06F 1/16* (2006.01)
(52) U.S. Cl. .................. 361/679.45; 710/315; 709/223; 312/223.2
(58) Field of Classification Search .............. 312/223.2, 312/107; 345/158; 710/313, 315, 2; 711/114; 206/501; 439/74; 361/679–687, 724–727
See application file for complete search history.

(56) References Cited

U.S. PATENT DOCUMENTS

2005/0155889 A1 *  7/2005  Lown ..................... 206/501
2007/0080614 A1 *  4/2007  Stein et al. .............. 312/107
2008/0002346 A1 *  1/2008  Lin et al. ................ 361/683

FOREIGN PATENT DOCUMENTS

| CN | 2436965 Y | 6/2001 |
| CN | 2517009 Y | 10/2002 |

\* cited by examiner

*Primary Examiner*—Hung V Duong
(74) *Attorney, Agent, or Firm*—Townsend and Townsend and Crew, LLP

(57) ABSTRACT

A stackable modular computer housing includes a rectangular frame, and top and bottom covers. The frame includes a surrounding wall, a first engaging portion extending from an upper edge of the surrounding wall, and a second engaging portion extending from a lower edge of the surrounding wall. An inner surface of one of the first and second engaging portions is flush with an outer surface of the other of the first and second engaging portions. The top cover includes a rectangular top plate for closing a top opening of the frame, and a third engaging portion extending from a peripheral edge of the top plate for engaging the first engaging portion. The bottom cover includes a rectangular bottom plate for closing a bottom opening of the frame, and a fourth engaging portion extending from a peripheral edge of the bottom plate for engaging the second engaging portion.

16 Claims, 5 Drawing Sheets

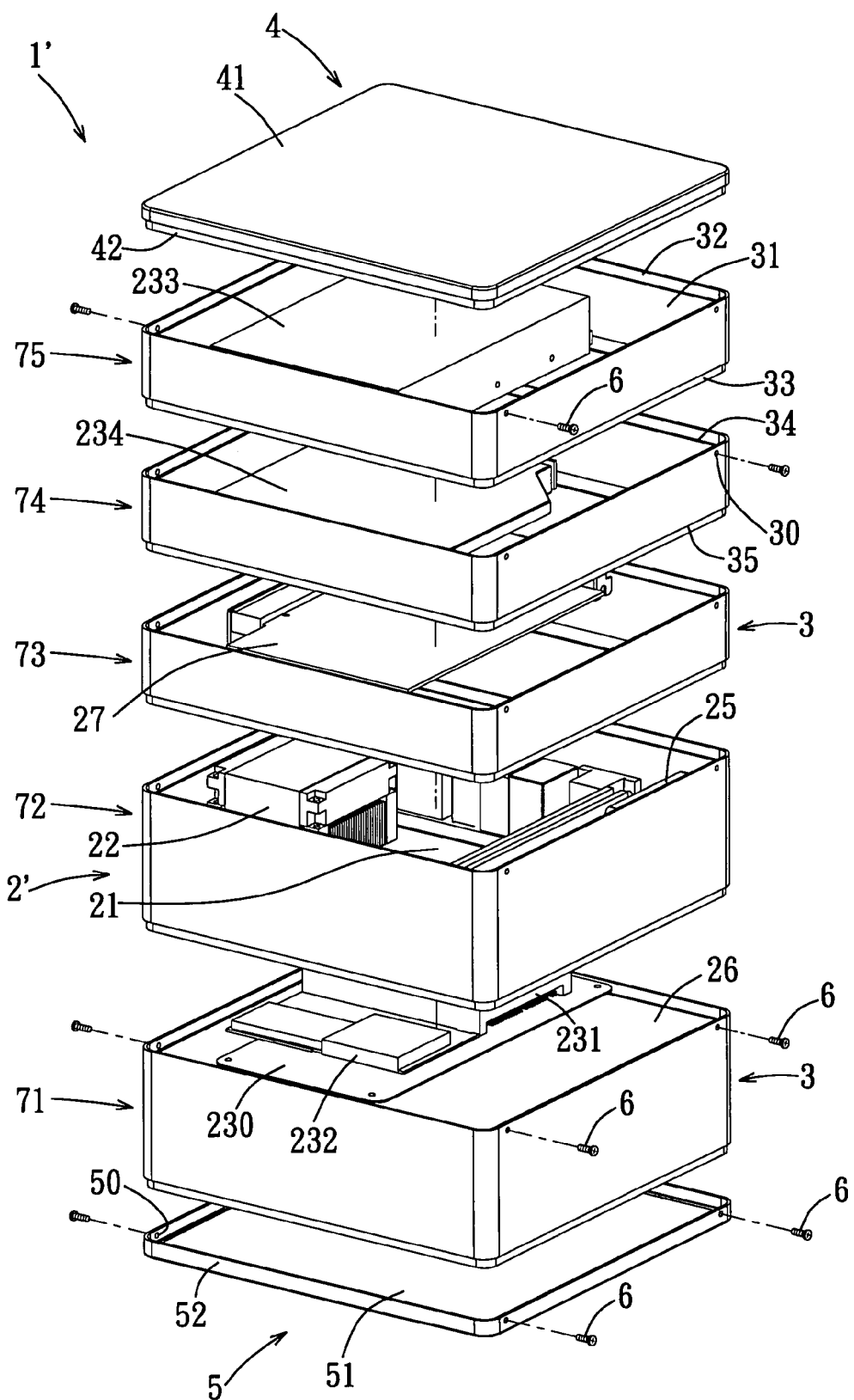
F I G. 4

STACKABLE MODULAR COMPUTER HOUSING, AND COMPUTER DEVICE INCLUDING THE SAME

CROSS-REFERENCES TO RELATED APPLICATIONS

This application claims priority to Taiwanese Application No. 095120014, filed Jun. 6, 2006, the disclosure of which is herein incorporated by reference.

BACKGROUND OF THE INVENTION

1. Field of the Invention

The invention relates to a computer housing, more particularly to a stackable modular computer housing, and a computer device including the same.

2. Description of the Related Art

A commercially available computer housing is generally provided with reserved expansion spaces so as to meet various expansion requirements, and is therefore designed to have a size larger than actually needed.

However, with the development of technology, the efficiency of various hardware devices (e.g., motherboards, hard disks, microprocessors) within the computer housing has been enhanced to such an extent that a single tiny device can have a very high efficiency. Thus, chances that a computer needs to be expanded are little, and the reserved expansion spaces of the computer housing are generally not utilized, thereby resulting in a waste of space. Besides, the computer housing appears unnecessarily bulky.

In view of the above-depicted situation, there are also available micro computer housings. Although available spaces are fully utilized in a micro computer housing, it does not allow for hardware expansion.

SUMMARY OF THE INVENTION

Therefore, an object of the present invention is to provide a stackable modular computer housing that can partition available spaces in a computer device into modular units and that is expandable according to requirements.

Another object of the present invention is to provide a computer device with stackable modular computer housings, which is expandable according to requirements.

Accordingly, a stackable modular computer housing of the present invention includes a rectangular frame, a top cover, and a bottom cover. The frame includes a surrounding wall, a first engaging portion extending from an upper edge of the surrounding wall, and a second engaging portion extending from a lower edge of the surrounding wall, an inner surface of one of the first and second engaging portions being flush with an outer surface of the other one of the first and second engaging portions.

The top cover includes a rectangular top plate for closing a top opening of the frame, and a third engaging portion extending from a peripheral edge of the top plate for engaging fittingly the first engaging portion. The bottom cover includes a rectangular bottom plate for closing a bottom opening of the frame, and a fourth engaging portion extending from a peripheral edge of the bottom plate for engaging fittingly the second engaging portion.

The computer device of the present invention includes the aforesaid computer housing and a hardware unit.

The hardware unit includes a motherboard mounted within the frame of the computer housing parallel to the bottom plate, a central processing unit disposed on the motherboard, and at least one storage device connected to the motherboard.

BRIEF DESCRIPTION OF THE DRAWINGS

Other features and advantages of the present invention will become apparent in the following detailed description of the preferred embodiments with reference to the accompanying drawings, of which:

FIG. 4 is an exploded perspective view to illustrate an assembling relationship between the computer housing and a hardware unit of the second preferred embodiment.

DETAILED DESCRIPTION OF THE PREFERRED EMBODIMENTS

Figure 1:
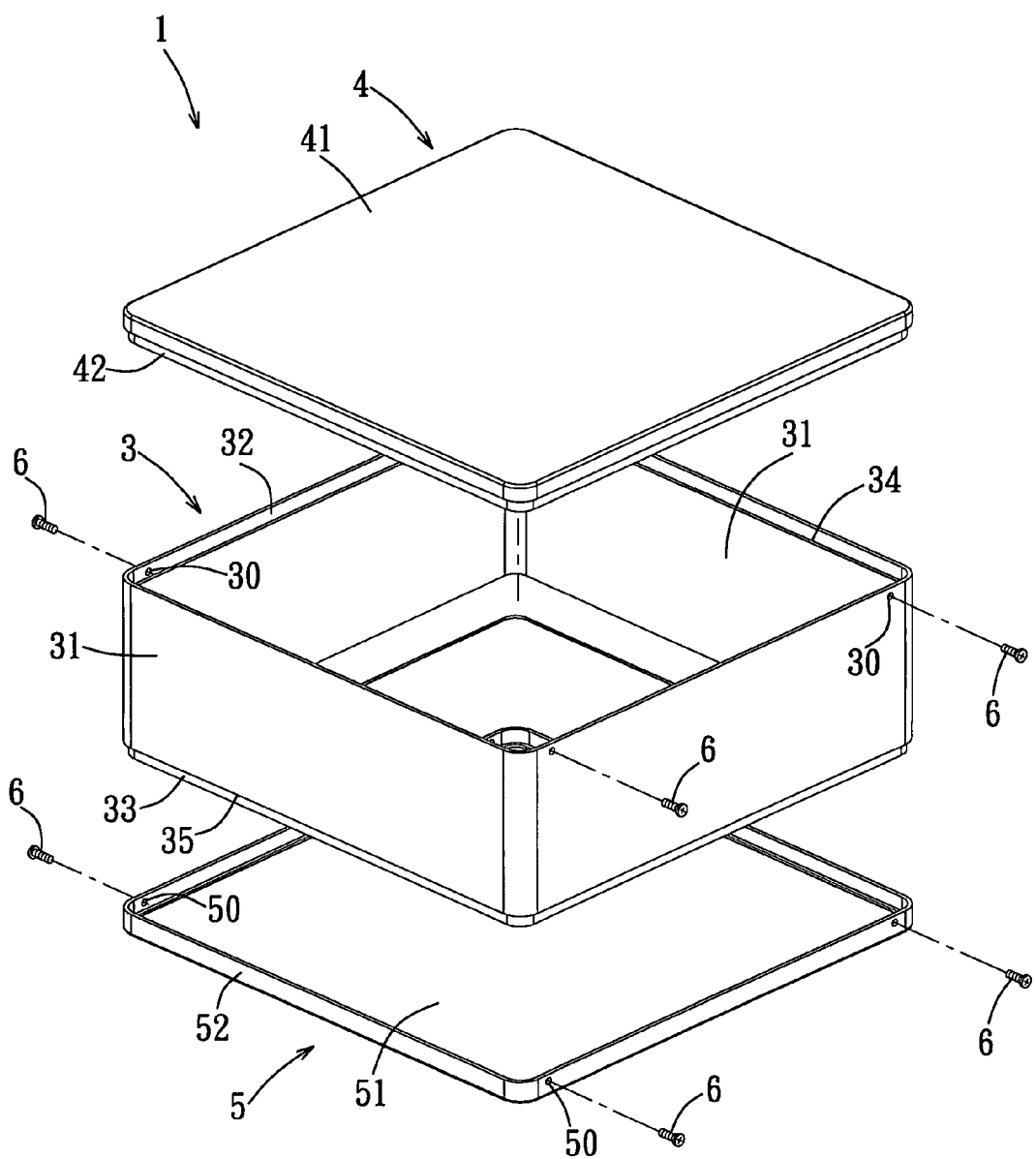
FIG. 1 is an exploded perspective view of a stackable modular computer housing of the first preferred embodiment of a computer device according to the present invention.

Before the present invention is described in greater detail, it should be noted that like elements are denoted by the same reference numerals throughout the disclosure.

Figure 2:
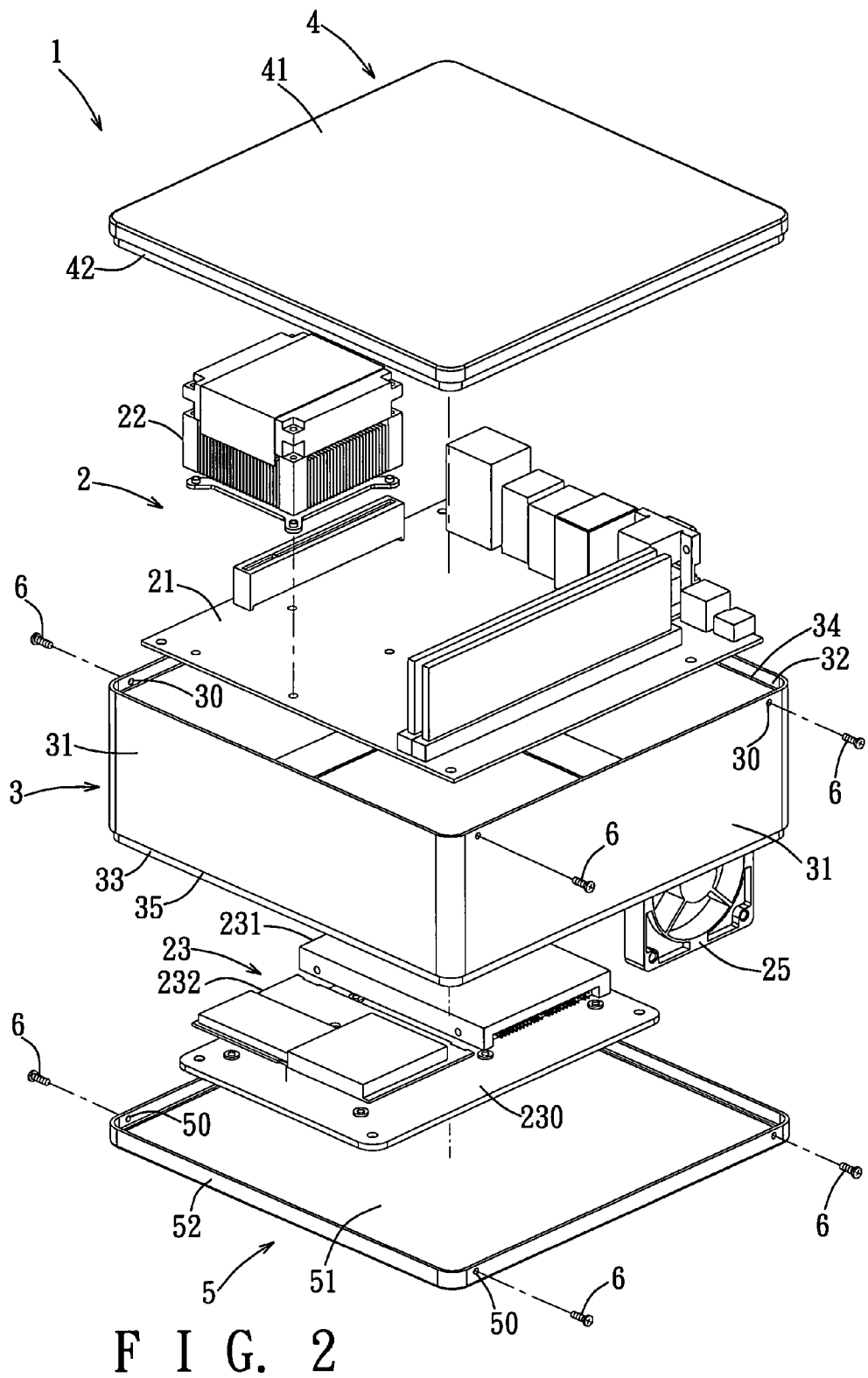
FIG. 2 is an exploded perspective view of the computer housing and a hardware unit of the first preferred embodiment.

Referring to FIGS. 1 and 2, the first preferred embodiment of a computer device having a stackable modular computer housing according to the present invention is shown to include a computer housing 1 and a hardware unit 2 mounted within the computer housing 1.

The computer housing 1 includes a frame 3 that can be used alone or in numbers according to expansion requirements, top and bottom covers 4, 5, and a plurality of fastening members 6. In the first preferred embodiment, the computer housing 1 includes a single frame 3.

The frame 3 includes a surrounding wall 31 having four upright wall parts that are interconnected to form a rectangular frame with top and bottom openings. The frame 3 further includes a first engaging portion 32 and a second engaging portion 33. The first engaging portion 32 extends upwardly from an upper edge of the surrounding wall 31, and has an inner surface that is recessed outwardly relative to an inner surface of the surrounding wall 31 so as to form a first shoulder 34 therebetween. The second engaging portion 33 extends downwardly from a lower edge of the surrounding wall 31, and has an outer surface that is recessed inwardly relative to an outer surface of the surrounding wall 31 so as to form a second shoulder 35 therebetween. In addition, the first engaging portion 32 is provided with a plurality of screw holes 30 that extend therethrough and that are distributed therealong. To meet the requirements of the hardware unit 2, the surrounding wall 31 is provided with wiring openings, heat dissipating vents, optical disk drive access ports, card insertion slots, etc., which are neither described in detail herein nor illustrated in the drawings since they are not crucial features of the present invention.

The top cover 4 includes a rectangular top plate 41 for closing the top opening of the frame 3, and a third engaging portion 42 that extends downwardly from a peripheral edge of the top plate 41. When the top cover 4 is disposed on the frame 3 to close the top opening, the inner surface of the first engaging portion 32 of the frame 3 abuts against an outer surface of the third engaging portion 42 of the top cover 4, and an end edge of the third engaging portion 42 abuts against the first shoulder 34.

The bottom cover 5 includes a rectangular bottom plate 51 for closing the bottom opening of the frame 3, and a fourth engaging portion 52 that extends upwardly from a peripheral edge of the bottom plate 51. When the bottom cover 5 closes the bottom opening of the frame 3, the outer surface of the second engaging portion 33 of the frame 3 abuts against an inner surface of the fourth engaging portion 52 of the bottom cover 5, and an end edge of the fourth engaging portion 52 abuts against the second shoulder 35. In addition, the fourth engaging portion 52 is provided with a plurality of screw holes 50 that correspond in position to the screw holes 30 of the first engaging portion 32.

The fastening members 6 are disposed to extend through the screw holes 30, 50 in the first engaging portion 32 of the frame 3 and the fourth engaging portion 52 of the bottom cover 5, respectively, so as to abut against a corresponding one of the third engaging portion 42 of the top cover 4 and the second engaging portion 33 of the frame 3.

The first and second engaging portions 32, 33 of the frame 3 are modularly designed such that they not only engage fittingly and respectively the third and fourth engaging portions 42, 52, the inner surface of one of the first and second engaging portions 32, 33 is also flush with the outer surface of the other one of the first and second engaging portions 32, 33. In this embodiment, the inner surface of the first engaging portion 32 is flush with the outer surface of the second engaging portion 33. Thus, additional frames 3 can be put on top of or below the frame 3 of this embodiment to permit expansion (to be described hereinafter). Certainly, the configurations of the corresponding engaging portions 42 and 32, 33 and 52 can be interchanged as desired, without being limited to this embodiment.

The hardware unit 2 mounted within the computer housing 1 of this embodiment is a standard computer system capable of normal operation, which obtains power supply through an external transformer (not shown), and includes a motherboard 21 mounted within the frame 3 parallel to the bottom plate 51, a central processing unit 22 provided on the motherboard 21, a plurality of storage devices 23 connected to the motherboard 21, and a system fan 25 mounted uprightly within the frame 3 and disposed on one side of the motherboard 21. The system fan 25 can generate a current of air to carry away some of the heat generated as a result of operation of the storage devices 23 and the central processing unit 22.

The hardware unit 2 may be secured within the frame 3 using a positioning frame or in any other suitable manner. As this is not the crux of this invention, it will not be discussed in detail herein for the sake of brevity.

In this embodiment, there are two storage devices 23, which are, respectively, a hard disk 231 and a card reader 232 that are accommodated between the bottom cover 5 and the motherboard 21 parallel to the motherboard 21, and which are secured on a positioning frame 230 that is detachably secured within the frame 3. The storage devices 23 can be secured within the frame 3 in other manners not limited to the above.

Figure 3:
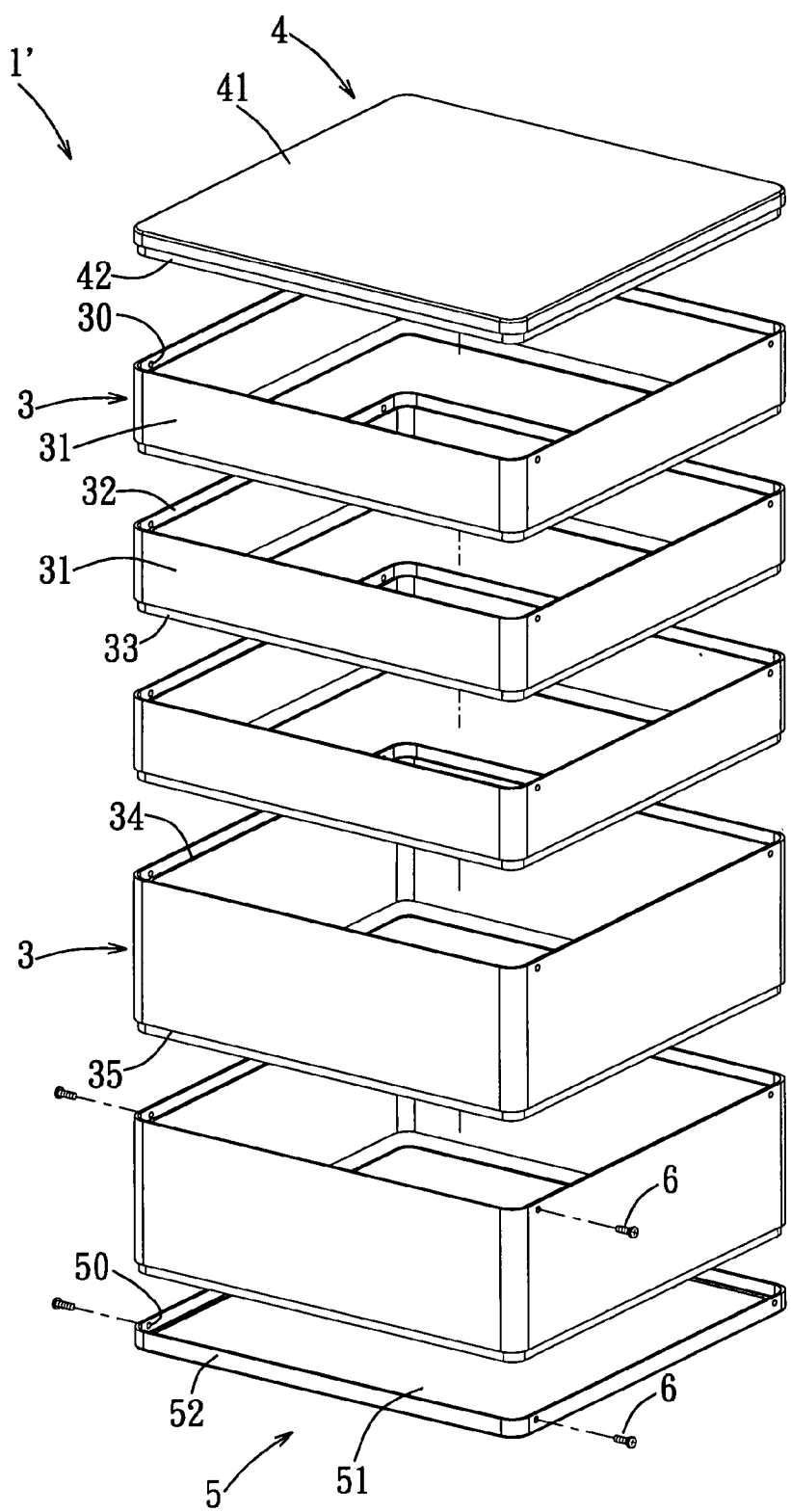
FIG. 3 is an exploded perspective view of a computer housing of the second preferred embodiment of a computer housing according to the present invention.
Figure 5:
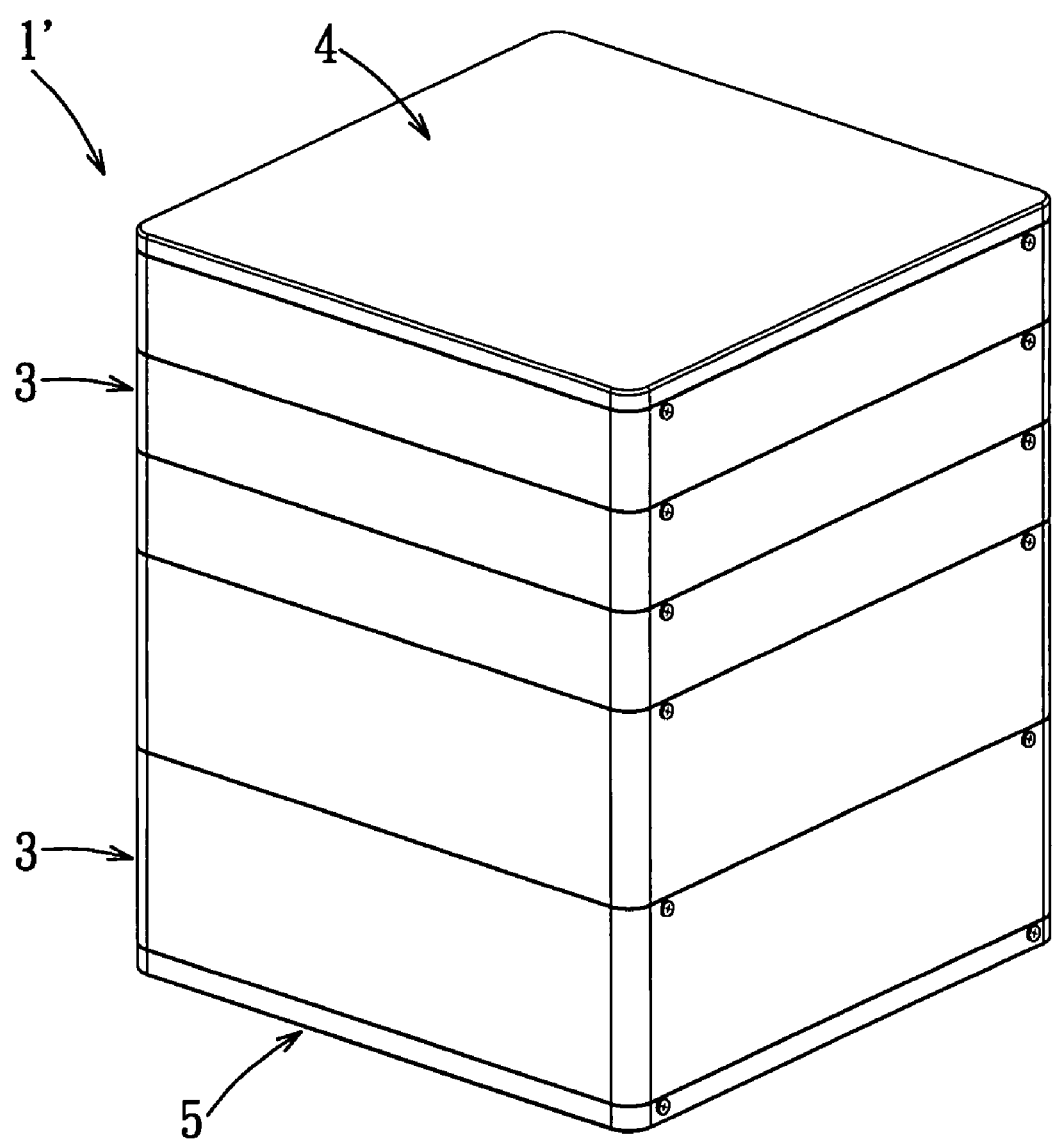
FIG. 5 is an assembled perspective view of the second preferred embodiment.

Referring to FIGS. 3 to 5, the second preferred embodiment of a computer device according to the present invention is expandable by increasing the number of the frames 3, and includes a computer housing 1' and a hardware unit 2'. The computer device of this embodiment as a whole is generally divided into a power layer 71, a motherboard layer 72, an upright expansion card layer 73, an optical disk drive layer 74, and a second hard disk layer 75. The computer housing 1' includes a plurality of frames 3. The length and width of the frames 3 must be the same, but the height thereof may vary. Pairs of the frames 3 can be stacked with one on top of the other so that additional spaces are available to accommodate more hardware devices.

This embodiment differs from the first preferred embodiment in that, aside from an increase in the number of the frames 3 constituting the computer housing 1', the hardware unit 2' includes a high-wattage power source 26 in place of the external transformer, which is accommodated in the frame 3 closest to the bottom cover 4. Wires of the power source 26 are disposed to extend within the frame 3, i.e., power is supplied to the motherboard 21 through internal wiring.

The hardware unit 2' further includes an expansion card module 27 accommodated in another frame 3 and capable of being mounted uprightly on the motherboard 21. The storage device 23 of the hardware unit 2' not only includes the hard disk 231 and the card reader 232, it further includes, but is not limited to, a second hard disk 233 and an optical disk drive 234 received in the added frame 3. The storage device 23 may further include a floppy disk drive, a CD RW drive, etc., which are connected to the motherboard 21 through the interconnected frames 3 by vertical mounting or internal wiring.

In sum, the present invention can have a compact size by virtue of a stacking design of modular frames, and can be expanded when required by increasing the number of the frames 3, thereby avoiding a waste of space. Besides, as the wires are routed internally, the aesthetical aspect of the computer device is also enhanced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A stackable modular computer housing, comprising:
   a rectangular frame including a surrounding wall, a first engaging portion extending from an upper edge of said surrounding wall, and a second engaging portion extending from a lower edge of said surrounding wall, an inner surface of one of said first and second engaging portions being flush with an outer surface of the other one of said first and second engaging portions;
   a top cover including a rectangular top plate for closing a top opening of said frame, and a third engaging portion extending from a peripheral edge of said top plate for engaging fittingly said first engaging portion; and
   a bottom cover including a rectangular bottom plate for closing a bottom opening of said frame, and a fourth engaging portion extending from a peripheral edge of said bottom plate for engaging fittingly said second engaging portion;
   wherein one of said first and third engaging portions surrounds the other one of said first and third engaging portions and is provided with a plurality of screw holes extending therethrough, and one of said second and fourth engaging portions surrounds the other one of said second and fourth engaging portions and is provided with a plurality of screw holes extending therethrough, said stackable modular computer housing further comprising a plurality of fastening members extending through said screw holes.

2. The stackable modular computer housing according to claim 1, wherein said inner surface of said first engaging portion and an outer surface of said third engaging portion abut against each other, and said outer surface of said second engaging portion and an inner surface of said fourth engaging portion abut against each other.

3. The stackable modular computer housing according to claim 1, wherein said inner surface of said first engaging portion is recessed outwardly relative to an inner surface of said surrounding wall so as to form a first shoulder therebetween for abutment by an end edge of said third engaging portion.

4. The stackable modular computer housing according to claim 1, wherein said outer surface of said second engaging portion is recessed inwardly relative to an outer surface of said surrounding wall so as to form a second shoulder therebetween for abutment by an end edge of said fourth engaging portion.

5. The stackable modular computer housing according to claim 1, further comprising an additional frame, said first engaging portion of one of said frames being capable of engaging fittingly said second engaging portion of the other one of said frames such that said frames can be stacked with one on top of the other.

6. A computer device, comprising:
a computer housing including:
a rectangular frame including a surrounding wall, a first engaging portion extending from an upper edge of said surrounding wall, and a second engaging portion extending from a lower edge of said surrounding wall, an inner surface of one of said first and second engaging portions being flush with an outer surface of the other one of said first and second engaging portions;
a top cover including a rectangular top plate for closing a top opening of said frame, and a third engaging portion extending from a peripheral edge of said top plate for engaging fittingly said first engaging portion; and
a bottom cover including a rectangular bottom plate for closing a bottom opening of said frame, and a fourth engaging portion extending from a peripheral edge of said bottom plate for engaging fittingly said second engaging portion; and
a hardware unit including a motherboard mounted within said frame of said computer housing parallel to said bottom plate, a central processing unit disposed on said motherboard, and at least one storage device connected to said motherboard.

7. The computer device according to claim 6, wherein said at least one storage device of said hardware unit includes at least one of a hard disk and a card reader accommodated between said bottom plate and said motherboard and parallel to said motherboard.

8. The computer device according to claim 7, wherein said at least one storage device is secured on a positioning frame that is detachably secured within said frame.

9. The computer device according to claim 6, wherein said hardware unit further includes a system fan mounted uprightly within said frame and disposed on one side of said motherboard.

10. The computer device according to claim 6, wherein said computer housing further includes an additional frame, said first engaging portion of one of said frames being capable of engaging fittingly said second engaging portion of the other one of said frames such that said frames can be stacked with one on top of the other.

11. The computer device according to claim 10, wherein said hardware unit further includes a power source accommodated within said additional frame, and internal wiring for enabling said power source to supply electric power to said motherboard.

12. The computer device according to claim 10, wherein said at least one storage device of said hardware unit includes at least one of a floppy disk drive, a hard disk, an optical disk drive, and a card reader that is accommodated within said additional frame.

13. The computer device according to claim 10, wherein said hardware unit further includes an expansion card module primarily accommodated within said additional frame and mounted uprightly on said motherboard.

14. The computer device according to claim 6, wherein one of said first and third engaging portions surrounds the other one of said first and third engaging portions and is provided with a plurality of screw holes extending therethrough, and one of said second and fourth engaging portions surrounds the other one of said second and fourth engaging portions and is provided with a plurality of screw holes extending therethrough, said computer housing further including a plurality of fastening members extending through said screw holes.

15. The computer device according to claim 6, wherein said inner surface of said first engaging portion and an outer surface of said third engaging portion abut against each other, and said outer surface of said second engaging portion and an inner surface of said fourth engaging portion abut against each other.

16. The computer device according to claim 6, wherein said inner surface of said first engaging portion is recessed outwardly relative to an inner surface of said surrounding wall so as to form a first shoulder therebetween for abutment by an end edge of said third engaging portion, and said outer surface of said second engaging portion is recessed inwardly relative to an outer surface of said surrounding wall so as to form a second shoulder therebetween for abutment by an end edge of said fourth engaging portion.

* * * * *